Jan. 1, 1974 R. N. KING ETAL 3,783,025
METHOD OF MAKING A THIN CADMIUM OXIDE
ELECTRODE WITH AN IONIC POLYMER AND
SUBSEQUENT REMOVAL OF THE POLYMER
Original Filed Nov. 12, 1969
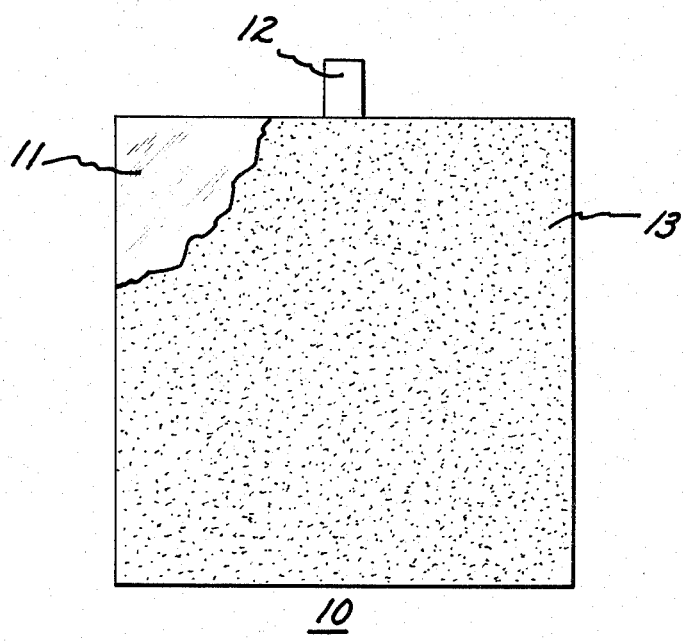
Inventors:
Randall N. King,
David W. Skelly,
by Paul R. Webb, II
Their Attorney.

United States Patent Office 3,783,025
Patented Jan. 1, 1974

3,783,025
METHOD OF MAKING A THIN CADMIUM OXIDE ELECTRODE WITH AN IONIC POLYMER AND SUBSEQUENT REMOVAL OF THE POLYMER
Randall N. King, Johnstown, and David W. Skelly, Ballston Lake, N.Y., assignors to General Electric Company
Original application Nov. 12, 1969, Ser. No. 875,918, now abandoned. Divided and this application Oct. 21, 1970, Ser. No. 82,845
Int. Cl. H01m 35/30
U.S. Cl. 136—76
1 Claim

ABSTRACT OF THE DISCLOSURE

A thin electrode is disclosed which has an electrically conductive sheet, and a thin layer of an active material of a metallic oxide, a metallic hydroxide, or a metal adhering to each major face of the sheet. A method is also described for making such electrodes. These electrodes are useful for small volume, small weight applications such as anodes in batteries for squibs and space vehicles.

---

This application is a division of application Ser. No. 875,918, filed Nov. 12, 1969, now abandoned, and assigned to the same assignee as the present application.

This invention relates to electrodes, and to methods of making electrodes, and, more particularly to thin composite electrodes, and to methods of making such electrodes.

Electrodes containing an active material of a metallic oxide, a metallic hydroxide, or a metal are used in various electrochemical cells such as batteries and fuel cells. Presently, electrodes containing an active material of cadmium are made by pressing, pasting or impregnating initially cadmium oxide or cadmium on an electrically conductive screen or grid. If cadmium oxide is employed, the oxide is reduced electrochemically to convert the oxide to the metal. The resulting structure is a negative electrode or plate which has a minimum thickness of about 25 mils. Such electrodes can also be formed by electroplating cadmium onto an electrically conductive sheet. While such an electrode is a thinner structure in that it has a thickness of about 10 mils the electrode passivates quickly before delivering the required output.

Our invention is directed to a thin composite electrode and a method of making such an electrode wherein the electrode occupies a very small volume within a cell or battery. An electrode made in accordance with our invention is a thin composite electrode in that its thickness is in a range from about 2 mils to 15 mils. Furthermore, our thin composite electrode when employing an active material of cadmium has a high discharge rate.

The thin composite electrodes of our invention are particularly useful when employing cadmium metal for special applications such as squibs. In this type of application, as in other types of applications where a small volume is required, the electrode of our invention meets this requirement through its thinness which reduces the total volume of the cell or battery. Additionally our electrode when employed as a negative plate in a cell or battery can produce in excess of 1.5 amp per square inch which is required for high discharge types of cells.

It is a primary object of our invention to provide a thin composite electrode which occupies a very small volume.

It is another object or our invention to provide an improved method of making such thin composite electrodes.

In accordance with one aspect of our invention, a thin composite electrode comprises an electrically conductive sheet, a thin layer of active material adhering to each major face of the sheet, and the thickness of the composite electrode in a range from 2 mils to 15 mils thickness.

These and various other objects, features and advantages of the invention will be better understood from the following description taken in connection with the accompanying drawing in which:

The single figure is an elevational view partially in section of an electrode made in accordance with our invention.

In the single figure of the drawing, there is shown generally at 10 a thin composite electrode embodying our invention which has an electrically conductive sheet 11 with an electrically conductive lead 12 attached thereto in any conventional manner, such as, by welding. A thin layer of active material 13 such as cadmium adheres to each major face of sheet 11. Sheet 11 is thin in that it is in a range of 1 to 5 mils in thickness. Active material layer 13 is thin in that it is in a range of 0.5 to 5 mils in thickness on each major face of sheet 11. Thus, electrode 10 is thin in that it is in a range of 2 to 15 mils in thickness as opposed to known cadmium electrodes which exhibit a minimum thickness of 25 mils.

We discovered unexpectedly that an improved thin composite electrode could be formed which occupied a small volume as compared to a conventional electrode with active material. We found that such an improved composite electrode could be formed by providing an electrically conductive sheet, such as a nickel sheet with a thickness in the range of 1 to 5 mils as the collector on which the active material would be coated. We prefer also to employ a nickel screen counter electrode in the solution coating process. We found that within a very short time interval of several seconds at a conventional current we were able to apply a layer of active material and a polymer on opposite major faces of the nickel sheet from a slurry containing an ionic polymer, a polar solvent, and an active material.

An ionic polymer is a polymer having a charge in solution responsive to the field induced by the electrodes immersed in the solution containing a polar solvent such as water. Examples of such ionic polymers, and coating solutions containing such ionic polymers and polar solvents are described and claimed in U.S. Letters Patent No. 3,440,196 issued on Apr. 22, 1969, in the names of Edith M. Boldebuck and Fred F. Holub; No. 3,440,197 issued on the same day and in the same names; and No. 3,448,068 issued June 3, 1969, in the names of Fred F. Holub and Richard F. Gaertner. These patents are issued to the same assignee as the present application.

Another such coating preparation is prepared by forming a water slurry of an active material such as cadmium oxide and Carboset 514, which is an acrylic resin manufactured by the B.F. Goodrich Company, Cleveland, Ohio.

The active material in the slurry can be in the form of a metallic oxide, a metallic hydroxide, or a metal. Suitable metallic oxides include cadmium oxide and lead dioxide while a suitable metallic hydroxide is nickel hydroxide. Suitable metals include cadmium, lead and zinc.

We found further that after coating, the coated sheet should be cured for a relatively short time in an air atmosphere oven. This resulted in retention of the active material on opposite sides of the nickel sheet. Since it is normally desirable to provide the negative plate electrode in the form of a metal rather than a metallic oxide electrode, the electrode with cadmium oxide was electrochemically reduced in a 31 weight percent potassium hydroxide electrolyte solution employing a conventional nickel screen as the counter electrode.

We found further that the electrode made in accordance with our invention with active material of cadmium could be assembled into a cell or battery as the negative plate wherein it would occupy only a small volume of the cell. Such a cell would typically employ a mercury electrode and a potassium hydroxide electrolyte. The employment of our electrode in this type of cell provides a cell with a high discharge rate which produce in excess 1.5 amps per square inch.

Examples of thin composite electrodes made in accordance with our invention are set forth below:

EXAMPLE 1

A thin composite electrode was made as described above and as shown in the drawing, wherein the electrically conductive sheet was in the form of nickel sheet with a thickness of 5 mils. A water slurry was prepared by adding 2 grams of cadmium oxide and 0.5 gram of Carboset 514 acrylic resin to 250 cc. of distilled water, which was stirred to provide a uniform slurry.

The nickel sheet was employed as the collector while a nickel screen was used as the counterelectrode in the above slurry. A 300-volt battery was used as the power sources to provide a current of approximately 100 milliamperes across the sheet and screen for a brief period of only two seconds. A thin layer of cadmium oxide and resin adhered to opposite major faces of the sheet.

The coated sheet was then placed in an air atmosphere and oven cured at a temperature 150° C. for a period of two minutes resulting in removal of the resin. The resulting structure was a cadmium oxide electrode. This electrode as the negative electrode and a nickel screen counterelectrode were placed in a 31 weight percent potassium hydroxide solution to electrochemically reduce the cadmium oxide to cadmium. A current density of 10 ma./cm.$^2$ was applied for a period of 30 minutes resulting in the reduction of cadmium oxide to cadmium. The resulting structure was a thin composite cadmium electrode with a total thickness of 6 mils in which nickel sheet was 5 mils in thickness and each opposite layer of cadmium was 0.5 mil in thickness.

EXAMPLE 2

Another thin composite electrode was made as in above Example 1. The resulting structure had the same thickness as the electrode in Example 1.

EXAMPLE 3

The electrode of Example 1 was employed to obtain polarization data by measuring its voltage against a mercuric oxide reference electrode. This data is set forth below in Table I.

TABLE I

| Voltage—volts | Current density—ma./in.$^2$ |
|---|---|
| 0.84 | 200 |
| 0.82 | 400 |
| 0.79 | 600 |
| 0.76 | 800 |
| 0.72 | 1,000 |
| 0.64 | 1,200 |

EXAMPLE 4

The electrode of Example 2 was employed to obtain polarization data by measuring its voltage against a mercuric oxide reference electrode. This data is set forth below in Table II.

TABLE II

| Voltage—volts | Current density ma./in.$^2$ |
|---|---|
| 0.85 | 200 |
| 0.82 | 400 |
| 0.80 | 600 |
| 0.76 | 800 |

While other modifications of the invention and variations thereof which may be employed within the scope of the invention have not been described, the invention is intended to include such as may be embraced within the following claim:

What we claim as new and desire to secure by Letters Patent of the United States is:

1. A method of making a thin composite electrode which comprises providing an electrically conductive sheet, positioning the sheet in a solution containing an ionic polymer, a polar solvent, and an active material consisting of cadmium oxide, positioning a counter electrode in the solution spaced from the sheet, applying a current across the sheet and counter electrode thereby depositing a thin layer of cadmium oxide active material and polymer on opposite major faces of the sheet, curing the coated sheet thereby retaining the layer of active material and removing the polymer and then electrochemically reducing the layer of cadmium oxide to cadmium metal.

References Cited

UNITED STATES PATENTS

| | | | |
|---|---|---|---|
| 2,478,322 | 8/1949 | Robinson et al. | 204—181 |
| 2,386,634 | 10/1945 | Robinson | 204—181 |
| 2,393,068 | 1/1946 | Ruben | 204—181 |
| 3,459,651 | 8/1969 | Weininger et al. | 204—181 |
| 2,899,480 | 8/1959 | Fleischek | 136—24 |
| 3,332,866 | 7/1967 | Wszolek | 204—181 |
| 3,461,044 | 8/1969 | Lyons, Jr. et al. | 204—181 |
| 3,326,721 | 6/1967 | Henderson et al. | 136—24 |
| 3,184,338 | 5/1965 | Mueller | 136—24 |
| 3,124,487 | 3/1964 | Duddy et al. | 136—136 |
| 3,266,893 | 8/1966 | Duddy | 75—222 |
| 3,181,973 | 5/1965 | Duddy | 136—120 |

ALLEN B. CURTIS, Primary Examiner

C. F. LeFEVOUR, Assistant Examiner

U.S. Cl. X.R.

136—34; 204—181